Oct. 5, 1965 A. M. BROWN 3,209,754

SURGICAL CLIP

Filed Aug. 10, 1961

INVENTOR.
ADOLPH M. BROWN
BY
Attorneys

United States Patent Office 3,209,754
Patented Oct. 5, 1965

3,209,754
SURGICAL CLIP
Adolph M. Brown, Beverly Hills, Calif., assignor of 20%
to Ernest C. Wood and 20% to Rene G. Levaux
Filed Aug. 10, 1961, Ser. No. 130,630
12 Claims. (Cl. 128—337)

This invention relates to a surgical clip and more particularly to a clip which is adapted for use as a skin clip for application instead of stitches to bring together the edges of skin separated by a wound, cut, incision, or the like, and for holding the edges together until wound healing has been advanced or for use as an abdominal or surgical clip to stop bleeding vessels or the like, or for holding the edges of vessels together during anastomosis.

This is a continuation-in-part of my copending application Serial No. 10,595, filed February 24, 1960, entitled "Means and Method for Suturing Wounds and Elements for Use in Same," now Patent No. 3,098,232, issued July 23, 1963.

In the aforementioned copending application, description is made of a skin clip, an applicator for use in combination with the skin clip for application of the skin clips into position of use, a device for the removal of the skin clips from position of use, and a loading device or cartridge for the insertion of a plurality of skin clips in the applicator in a manner sequentially to be advanced in position to be applied by the applicator.

As described in the aforementioned copending application, the clips comprise U-shaped disc members having spicules extending laterally from each of the end portions of one arm of the U-shaped members in the direction towards the opposite arm with the spicules turned downwardly at an angle to enter the surface portions of the skin positioned therebetween as the free ends of the U-shaped clip members are displaced in the direction towards each other by the applicator to engage the underlying spaced portions of the skin located therebetween to bring the engaged portions of the skin in the direction towards each other and to hold the wound edges in substantially or approximate abutting relationship. The applicator comprises a pair of spaced jaw members having recesses in the outer edges to provide seats adapted to be engaged by the shoulders formed in the end portions of the arms of the clip members thereby properly to position the clip members between the jaws for application into operative engagement with the underlying surface of the skin as the jaws are displaced in the direction towards each other to deform the arms by a squeezing action.

It has been found that, in the described construction and arrangement, the concentration of elements including the jaw members and the clip members engaged between the operating end portions of the jaw members tend to obstruct the underlying area to which the clips are to be applied so that accurate control in the positioning of the clips and in their application is achieved with some difficulty.

It is an object of this invention to provide a new and improved surgical or skin clip which is capable of use with an applicator of the type described but in which greater access is available for observation of the clip and the area of the skin underlying the clip for better visual observation and control of the suturing or clipping operation.

More specifically, it is an object of this invention to produce a new and improved surgical clip embodying means for engagement by the applicator at a point rearwardly of the engaging portion of the clip whereby the engaged portion of the clip extends forwardly clear of the applicator for better observation and control of the use thereof.

These and other objects and advantages of this invention will hereinafter appear and for purposes of illustration, but not of limitation, embodiments of the invention are shown in the accompanying drawing in which—

Figure 1:
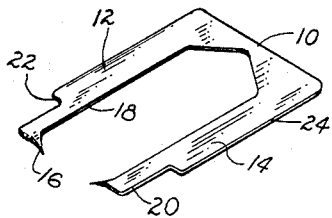
FIG. 1 is a perspective view of one modification of a surgical clip embodying the features of this invention.

In accordance with the practice of this invention, the surgical clip or skin clip is formed of thin, deformable sheet material, cut or otherwise formed to U-shape with a rear web 10 or bail portion and with a pair of laterally spaced apart, forwardly extending, parallel arm portions 12 and 14. As in the construction described in the aforementioned copending application, the arms 12 and 14 are each provided at their forward end portions with a spicule 16 which extends laterally from the inner edge 18 in the direction towards the opposite arm and which extends downwardly from the plane of the clip in the direction towards the underlying surface of the skin so that the spicules 16 will snag into the surface to become engaged therein, as the clip is deformed by the applicator to displace the arms 12 and 14 in the direction towards each other.

As described in the aforementioned copending application, the spicules 16 may be located in the end portion of the arm, as shown in FIG. 1, or the spicules may be spaced rearwardly from the ends of the arms, as illustrated in FIGS. 2–5. Under the latter circumstances, the portions of the arm at the base of the spicules function in the manner of stops or shoulders on opposite sides of the spicules to limit the amount of penetration into the skin.

Figure 2:
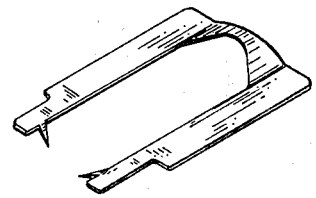
FIG. 2 is a perspective view similar to that of FIG. 1 showing another modification in the clip member.
Figure 3:
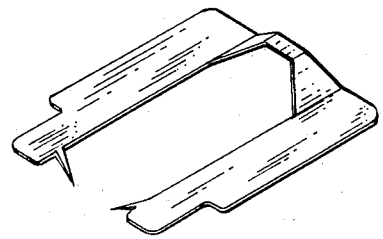
FIG. 3 is a perspective view similar to that of FIG. 2 illustrating a still further modification in a clip member.
Figure 5:
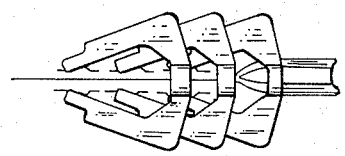
FIG. 5 is a top plan view showing the clips of FIG. 1 in position of use to effect closure of a skin wound.
Figure 4:
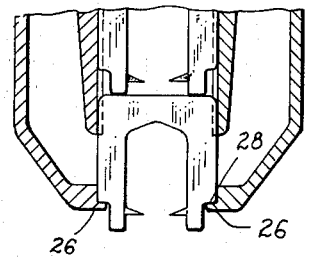
FIG. 4 is a schematic sectional view illustrating the location of a clip member of the type shown in FIG. 1 in position of use within an applicator.

The clips may be formed with but a single spicule extending laterally from the inner edge of each arm or they may be provided with more than one spicule in each arm with the spicules spaced lengthwise one from the other for more effective engagement with the underlying tissue or other vessel adapted to be engaged between the opposite arms of the clip members. The clips may be formed of a flat strip of sheet material, as illustrated in FIGS. 1 and 5, or they may be formed with an arcuate or offset bail or web, as illustrated in FIGS. 2–4.

While the aforementioned copending application defines the clips as being adapted for use in the suturing of lacerations, cuts or the like wounds of the skin, it will be understood that the clips embodying the features of this invention are adapted for use not only as skin closures but also for use internally as surgical clips in abdominal applications or for the joinder of tissues one with another for anastomosis. It will be sufficient if the spicules are formed to extend from the arm members for a distance greater than 0.005 inch and preferably within the range of 0.01 to 0.1 inch, and more preferably about .025 inch, and, for abdominal use or other internal use, the spicules may be formed to even greater lengths up to 0.2 inch.

An important concept of this invention resides in the formation of the clips with an end portion 20 of lesser width than the remainder to provide shoulders 22 in the outer edges 24 in position to be received within the seats provided in the ends of the applicator jaws, when the latter are in open position to receive the clips, whereby the end portions 20 of lesser dimension, and which preferably contain the spicules, extend forwardly between the applicator jaws 26 for a distance beyond the applicator jaws. For this purpose, it is desirable to form the clips to a width which is greater than the spaced relationship between the seats 28 in the applicator jaws 26, when in open position but with the outer end portions of the clip arms 12 and 14 being cut away or otherwise recessed to provide a width between said recessed portions of the arms which is less than the spaced relationship between the applicator jaws 26 so that such end portions 20 of lesser width can be displaced to extend forwardly between the applicator jaws while the remainder is incapable of displacement beyond the applicator jaws thereby to be received in seated relationship therebetween. The end portions 20 of lesser width are dimensioned to have a length sufficient to extend for a distance beyond the applicator jaws when the shoulders 22 of the clips are received within the seats 28 of the applicator jaws and the spicules 16 are preferably arranged to project inwardly and downwardly from said forwardly extending portions 20 of lesser dimension so that the spicules will be free of the applicator and positioned forwardly thereof, as illustrated in FIG. 4.

The clip members can be formed to various dimensions and of various materials, depending upon use. For skin wound closure, the clips may be of smaller dimension and they may be formed of plastic, such as hardened or chromicized gelatin, collagen, compressed dried blood, casein, albumen, cellulose acetate-butyrate, polystyrene, polytetrafluoroethylene, polyvinylidene chloride and the like, or they may be formed of metal which is not corrosively attacked by the elements on the surface of the skin such as moisture, secretions from the skin, or medicaments applied to the skin. Suitable materials of which the clips may be formed include stainless steel, aluminum, tantalum and the like.

For use as a surgical clip adapted for internal application, the clips may be formed to larger dimension and it is preferred to make use of a material which is slowly absorbable or disintegrated by the body fluids, such as when formed of chromicized gelatin, albumen, casein, and the like. Instead the clip members for internal use may be formed of metal such as tantalum, stainless steel and the like.

It will be understood that the clips may be formed of other equivalent shapes wherein the spicules are provided in the end portions of elongate, spaced arm members interconnected one to the other in a manner to permit deformation whereby the spicules on the end portion of the arms are displaced in the direction towards each other to effect a gripping relationship of the underlying elements located therebetween.

It will be understood that further changes may be made in the details of construction, arrangement and operation without departing from the spirit of the invention, especially as defined in the following claims.

I claim:
1. A surgical clip comprising a sheet metal member cut substantially to U-shape having a bail portion and a pair of spaced parallel arms extending forwardly from the ends of said bail portion, said bail portion and arms having top and bottom flat surfaces with the arms having a forward end and inner and outer lateral edges along the lengths thereof, the outer edge portions in the forward end portions of each arm being cut away to define a recessed portion having a stop shoulder at the base thereof, and spicules integral with the inner edges of each arm in the forward end portions thereof and extending angularly downwardly beyond the plane formed by the bottom walls of the arms.

2. A surgical clip as claimed in claim 1 in which the spicules are located at about the end portion of each of said arms.

3. A surgical clip as claimed in claim 1 in which the spicules are located in spaced relation with the end portions of each of the arms to provide stop shoulders at each side adjacent the base of each spicule to limit the penetration thereof.

4. A surgical clip as claimed in claim 1 in which each arm is formed with more than one spicule extending from the inner edge thereof in longitudinally spaced apart relation.

5. A surgical clip as claimed in claim 1 in which the central portion of the bail portion is offset from the remainder.

6. A surgical clip as claimed in claim 5 in which the offset portion is curvilinear in shape.

7. A surgical clip as claimed in claim 5 in which the offset portion is polygonal in shape.

8. A surgical clip as claimed in claim 1 in which the spicules are more than 0.010 inch but less than 0.1 inch in length.

9. A surgical clip as claimed in claim 1 in which the strip is formed of a plastic material which slowly breaks down in the body fluids.

10. A surgical clip as claimed in claim 1 in which the strip is formed of a metal that is resistant to deterioration or attack by the body fluids.

11. A surgical clip as claimed in claim 10 in which the strip is formed of stainless steel.

12. A surgical clip as claimed in claim 10 in which the strip is formed of aluminum.

References Cited by the Examiner

UNITED STATES PATENTS

| | | | |
|---|---|---|---|
| 715,612 | 12/02 | Van Schott | 128—337 |
| 816,026 | 3/06 | Meier | 128—337 |
| 2,120,143 | 6/38 | Divel | 24—87 X |
| 2,158,242 | 5/39 | Maynard | 1—56 X |
| 2,329,440 | 9/43 | La Place | 1—56 X |
| 2,684,070 | 7/54 | Kelsey | 128—337 |
| 2,817,339 | 12/57 | Sullivan | 128—334 |
| 3,006,344 | 10/61 | Vogelfanger | 128—334 X |
| 3,068,870 | 12/62 | Levin | 128—337 |

OTHER REFERENCES

"Absorbable Metal Clips as Substitutes for Ligatures and Deep Sutures in Wound Closure," from J.A.M.A. July 28, 1917, pp. 278–281.

RICHARD A. GAUDET, *Primary Examiner.*

RICHARD J. HOFFMAN, JORDAN FRANKLIN,
*Examiners.*